(12) United States Patent
Foo et al.

(10) Patent No.: US 10,797,510 B2
(45) Date of Patent: Oct. 6, 2020

(54) POWER STORAGE AND SUPPLY METHOD AND SYSTEM FOR A DRILLING RIG

(71) Applicants: KEPPEL OFFSHORE & MARINE TECHNOLOGY CENTRE PTE LTD, Singapore (SG); KEPPEL FELS LIMITED, Singapore (SG)

(72) Inventors: Kok Seng Foo, Singapore (SG); Wey Lii Lee, Singapore (SG); Rajinee Kuna, Singapore (SG); Bernard Voon Ee How, Singapore (SG); Shaikh Afshar Hussain, Singapore (SG)

(73) Assignees: Keppel Offshore & Marine Technology Centre Pte Ltd, Singapore (SG); Keppel FELS Limited, Singapore (SG)

( * ) Notice: Subject to any disclaimer, the term of this patent is extended or adjusted under 35 U.S.C. 154(b) by 224 days.

(21) Appl. No.: 15/798,192

(22) Filed: Oct. 30, 2017

(65) Prior Publication Data
US 2018/0123384 A1   May 3, 2018

(30) Foreign Application Priority Data

Oct. 31, 2016   (SG) .......................... 10201609106X

(51) Int. Cl.
*H02K 7/14*   (2006.01)
*H02J 7/14*   (2006.01)
(Continued)

(52) U.S. Cl.
CPC .......... *H02J 7/1423* (2013.01); *E21B 19/008* (2013.01); *H02J 5/00* (2013.01);
(Continued)

(58) Field of Classification Search
CPC .. E21B 19/008; E21B 41/00; H02J 2007/143; H02J 3/381; H02J 5/00; H02J 7/0068;
(Continued)

(56) References Cited

U.S. PATENT DOCUMENTS

| 2008/0203734 A1* | 8/2008 | Grimes ..................... E21B 3/02 290/40 R |
| 2013/0271083 A1* | 10/2013 | Williams .................. H02J 3/28 320/128 |

(Continued)

*Primary Examiner* — Eduardo Colon Santana
*Assistant Examiner* — Gabriel Agared
(74) *Attorney, Agent, or Firm* — Erise IP, P.A.

(57) ABSTRACT

The invention provides a power storage and supply method and system for a drilling rig. The system comprises a primary common direct current (DC) bus, at least one secondary DC bus, at least one bi-directional DC-to-DC converter connected between the primary common DC bus and the secondary DC bus, at least one motor group each connected to the secondary DC bus through a DC-to-AC inverter, and an Energy Storage System (ESS) configured to be charged by regenerative energy from at least one motor group and discharge power to at least one motor group through the primary common DC bus and the bi-directional DC-to-DC converter. The system may further comprise a bi-directional AC-to-DC converter between the primary DC bus and an AC bus, wherein the ESS is further configured to be charged by regenerative energy generated during lowering operation of a jacking system for the drilling rig, wherein the jacking system is connected to the AC bus.

30 Claims, 13 Drawing Sheets

(51) Int. Cl.
*H02J 5/00* (2016.01)
*E21B 19/00* (2006.01)
*H02J 7/00* (2006.01)
*H02P 5/74* (2006.01)
*H02J 3/38* (2006.01)
*E21B 41/00* (2006.01)
*H02J 7/35* (2006.01)

(52) U.S. Cl.
CPC .......... *H02J 7/0068* (2013.01); *H02J 7/1415* (2013.01); *H02P 5/74* (2013.01); *E21B 41/00* (2013.01); *H02J 3/381* (2013.01); *H02J 7/143* (2020.01); *H02J 7/35* (2013.01)

(58) Field of Classification Search
CPC .......... H02J 7/1415; H02J 7/1423; H02J 7/35; H02P 5/74
USPC ............................................................ 318/4
See application file for complete search history.

(56) References Cited

U.S. PATENT DOCUMENTS

| | | | | |
|---|---|---|---|---|
| 2013/0307444 | A1* | 11/2013 | Settemsdal | B63J 3/02 |
| | | | | 318/139 |
| 2014/0218985 | A1* | 8/2014 | Yu | H02M 7/537 |
| | | | | 363/97 |
| 2017/0133852 | A1* | 5/2017 | Macdonald | H02J 3/382 |
| 2017/0133858 | A1* | 5/2017 | Pan | H02J 11/00 |
| 2018/0167028 | A1* | 6/2018 | Agarwal | H02M 3/1588 |

\* cited by examiner

Table 1

| S. No. | ESS Features | ESS Status | |
|---|---|---|---|
| | | Charge | Discharge |
| 1 | Drawworks Regenerative Energy Recovery | ✓ | ✗ |
| 2 | Jacking Regenerative Energy Recovery | ✓ | ✗ |
| 3 | Fuel Efficient Operation Mode | ✓ | ✗ |
| 4 | Jacking Inrush Current Reduction | ✗ | ✓ |
| 5 | Reduce Drilling DC Power Variation | ✗ | ✓ |
| 6 | Optimal Discharge Mode | ✓ | ✓ |
| 7 | Renewable Input | ✓ | ✗ |

Figure 5 (a)

Table 2

| ESS Features / Benefits | Energy recovery + Fuel Optimization | Power Quality / Reliability + | Availability | Emissions |
|---|---|---|---|---|
| 1 | Drawworks Regenerative Energy Recovery | ✓ | | | ✓ |
| 2 | Jacking Regenerative Energy Recovery | ✓ | | | ✓ |
| 3 | Fuel Efficient Operation Mode | ✓ | | | ✓ |
| 4 | Jacking Inrush Current Reduction | | ✓ | | |
| 5 | Reduce Drilling DC Power Variation | | ✓ | ✓ | |
| 6 | Optimal discharge mode | | ✓ | ✓ | |
| 7 | Renewable Input | ✓ | | | ✓ |

Figure 5 (b)

POWER STORAGE AND SUPPLY METHOD AND SYSTEM FOR A DRILLING RIG

RELATED APPLICATION

This application claims priority to Singapore Patent Application No. 10201609106X, filed Oct. 31, 2016, the disclosure of which is incorporated herein by reference in its entirety.

FIELD OF INVENTION

The invention generally relates to energy storage and supply technologies for drilling rigs and, more particularly, to a power storage and supply method and system wherein the system includes an Energy Storage System (ESS) for absorbing and storing regenerative energy to improve performance of the power supply system and enhance fuel efficiency of the drilling rig, and for discharging the stored energy or power to operate motors and/or other loads.

BACKGROUND

It has been found that regenerative energy can be generated during some operations of a drilling rig, e.g. operations of drawworks and jacking system of the drilling rig. However, existing power supply systems for drilling rig do not include a system for absorbing and storing the regenerative energy and therefore any generated energy would be wasted.

During operation of drawworks, with lowering of an empty travelling block or with the drill-string attached for tripping-in operation, regenerative energy is first converted into kinetic energy, then converted into electrical energy at the drawworks motors, i.e. motors for operating the drawworks, and finally transferred to the braking resistors on the DC bus, to be dissipated as heat.

During operation of the jacking system, when the hull or leg(s) are being lowered, the jacking motors, i.e. motors for operating the jacking system, act as generators and feed the regenerative energy back into the power supply system. Additional loads may be switched on to consume the regenerative energy. However, it is not always necessary to switch on the additional loads.

It is therefore desirable to provide a power storage and supply system for a drilling rig which includes a system for absorbing and storing regenerative energy generated during operations of the drilling rig.

SUMMARY OF INVENTION

Embodiments of the invention provide a power storage and supply method and system. The system includes an Energy Storage System (ESS) configured for absorbing and storing regenerative energy generated during operations of a drilling system in the drilling rig, and for discharging the stored energy or power to operate motors and/or other loads.

According to one aspect of the invention, a power storage and supply method for a drilling rig is provided. The method comprises:

charging an Energy Storage System (ESS) by regenerative energy from at least one motor group, wherein the ESS is connected to a primary common DC bus, wherein at least one bi-directional DC-to-DC converter is connected between the primary common DC bus and at least one secondary DC bus, and wherein at least one DC-to-AC inverter is connected between the at least one secondary DC bus and the at least one motor group; and discharging power from the ESS to any motor group through the primary common DC bus, the at least one bi-directional DC-to-DC converter, the at least one secondary DC bus, and the at least one DC-to-AC inverter, wherein the any motor group is connected to the at least one DC-to-AC inverter.

According to another aspect of the invention, a power storage and supply system for a drilling rig is provided. The system comprises:

a primary common direct current (DC) bus;
at least one secondary DC bus;
at least one bi-directional DC-to-DC converter connected between the primary common DC bus and the at least one secondary DC bus;
at least one motor group connected to the at least one secondary DC bus through at least one DC-to-AC inverter; and
an Energy Storage System (ESS) connected to the primary common DC bus and configured to be charged by regenerative energy from at least one motor group and, discharge power to any motor group through the primary common DC bus, the at least one bi-directional DC-to-DC converter, the at least one secondary DC bus, and the at least one DC-to-AC inverter, wherein the any motor group is connected to the at least one DC-to-AC inverter.

By introducing an ESS, the at least one bi-directional DC-to-DC converter and the primary common DC bus connected between the ESS and the at least one bi-directional DC-to-DC converter in the power storage and supply system for a drilling rig, the regenerative energy, e.g. generated from lowering travelling block by a drawworks, can be absorbed and stored. The stored energy or power can then be fed back to operate motors and/or loads in the drilling rig as and when needed, in such a way that it optimizes the operating point of the generator sets.

BRIEF DESCRIPTION OF THE DRAWINGS

The invention will be described in detail with reference to the accompanying drawings, in which:

FIG. 5($a$) shows Table 1 indicating status of the ESS, charging/discharging, for each Feature;

FIG. 5($b$) shows Table 2 indicating benefits of each Feature;

FIG. 6($b$) is a Table indicating status of each component in the power storage and supply system for Feature 1;

FIG. 7($b$) is a Table indicating status of each component in the power storage and supply system for Feature 2;

FIG. 8($b$) is a Table indicating status of each component in the power storage and supply system for Feature 3;

DETAILED DESCRIPTION OF EMBODIMENTS OF THE INVENTION

Figure 1:
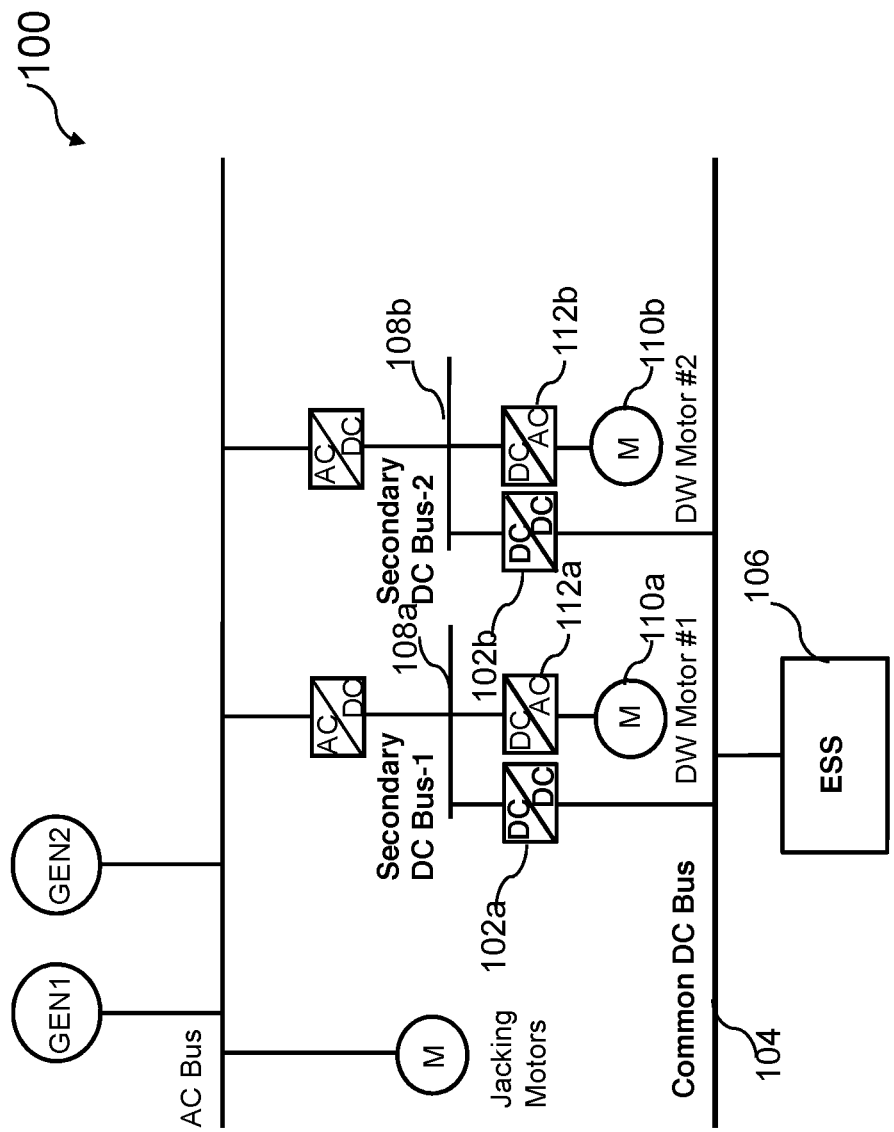
FIG. 1 shows a power storage and supply system for a drilling rig according to a first embodiment of the invention.

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention. In the drawings, like reference numerals refer to same or similar functionalities or features throughout the several views.

Embodiments of the invention provide a power storage and supply system for a drilling rig. The power storage and supply system is provided with an Energy Storage System (ESS) configured to be charged by regenerative energy produced during operations of the drilling rig and discharge the stored energy or power to operate motors and/or other loads.

FIG. 1 shows a power storage and supply system 100 for a drilling rig according to a first embodiment of the invention. Referring to FIG. 1, in this embodiment, the power storage and supply system 100 includes a common DC bus 104 (or "primary common DC bus"), two secondary DC buses 108a and 108b, two bi-directional DC-to-DC converters 102a and 102b, two motor groups 110a and 110b, two DC-to-AC inverters 112a and 112b, and an ESS 106.

A first bi-directional DC-to-DC converter 102a is connected between the common DC bus 104 and a first secondary DC bus 108a, and is configured to allow power flow from the first secondary DC bus 108a to the common DC bus 104, and vice versa. Similarly, a second bi-directional DC-to-DC converter 102b is connected between the common DC bus 104 and a second secondary DC bus, and configured to allow power to flow from the secondary DC bus 108b to the common DC bus 104, and vice versa. A first and a second motor group 110a and 110b are connected to the first and the second secondary DC buses 108a and 108b respectively through a first and a second DC-to-AC inverter 112a and 112b respectively.

The ESS 106 is connected to the common DC bus 104 and configured to be charged by regenerative energy from at least one of the motor groups 110a and 110b, and discharge power to at least one of the motor groups 110a and 110b.

Referring to FIG. 1, the ESS 106 can be charged by a power flow from the first motor group 110a through the first DC-to-AC inverter 112a, the first secondary DC bus 108a, the first bi-directional DC-to-DC converter 102a and the common DC bus 104, and/or by a power flow from the second motor group 110b through the second DC-to-AC inverter 112b, the second secondary DC bus 108b, the second bi-directional DC-to-DC converter 102b and the common DC bus 104.

The ESS 106 is also configured to discharge power to the first motor 110a through the common DC bus 104, the first bi-directional DC-to-DC converter 102a, the first secondary DC bus 108a, and the first DC-to-AC inverter 112a, and/or discharge power to the second motor 110b through the common DC bus 104, the second bi-directional DC-to-DC converter 102b, the second secondary DC bus 108b, and the second DC-to-AC inverter 112b.

It is to be appreciated that the ESS 106 may comprise a battery, a super capacitor, and/or any other energy storage device, e.g. a flywheel, and each of the motor groups 110a and 110b includes at least one motor.

It should be noted that the embodiment shown in FIG. 1 is only used for illustration and does not limit the scope of the claims. The number of bi-directional DC-to-DC converters, the number of secondary DC buses, and the number of DC-to-AC inverters in the power storage and supply system may be varied in other embodiments. In addition, if the power storage and supply system includes a plurality of bi-directional DC-to-DC converters and a plurality of secondary DC buses, at least two of the plurality of secondary DC buses are electrically connected in certain embodiments to provide a secondary common DC bus, or electrically unconnected in other embodiments, and the ESS may be simultaneously charged by at least two of the plurality of bi-directional DC-to-DC converters.

With the ESS 106 in the power storage and supply system 100, regenerative energy generated during operation of drawworks can be absorbed and stored, e.g. the ESS 106 is configured to be charged during lowering of travelling block by a drawworks of the drilling rig. The stored energy can then be utilized to supply power to loads as and when needed, in such a way that it optimizes the operating point of the generator sets. Further, with the common DC bus 104 connected to the ESS 106 and the DC bus 108a and 108b, the ESS 106 is configured to discharge power during hoisting of travelling block by the drawworks, i.e. the stored regenerative energy can be fed back through the secondary DC buses 108a and 108b directly to power drawworks motors for the next hoisting of the travelling block. It is to be appreciated that the stored regenerative energy may also be used to discharge power to other rig loads motors for different uses in the drilling rig, e.g. motors for operating chillers, sea water pumps, air compressors, mud pumps, rotary table and top drive.

Figure 2:
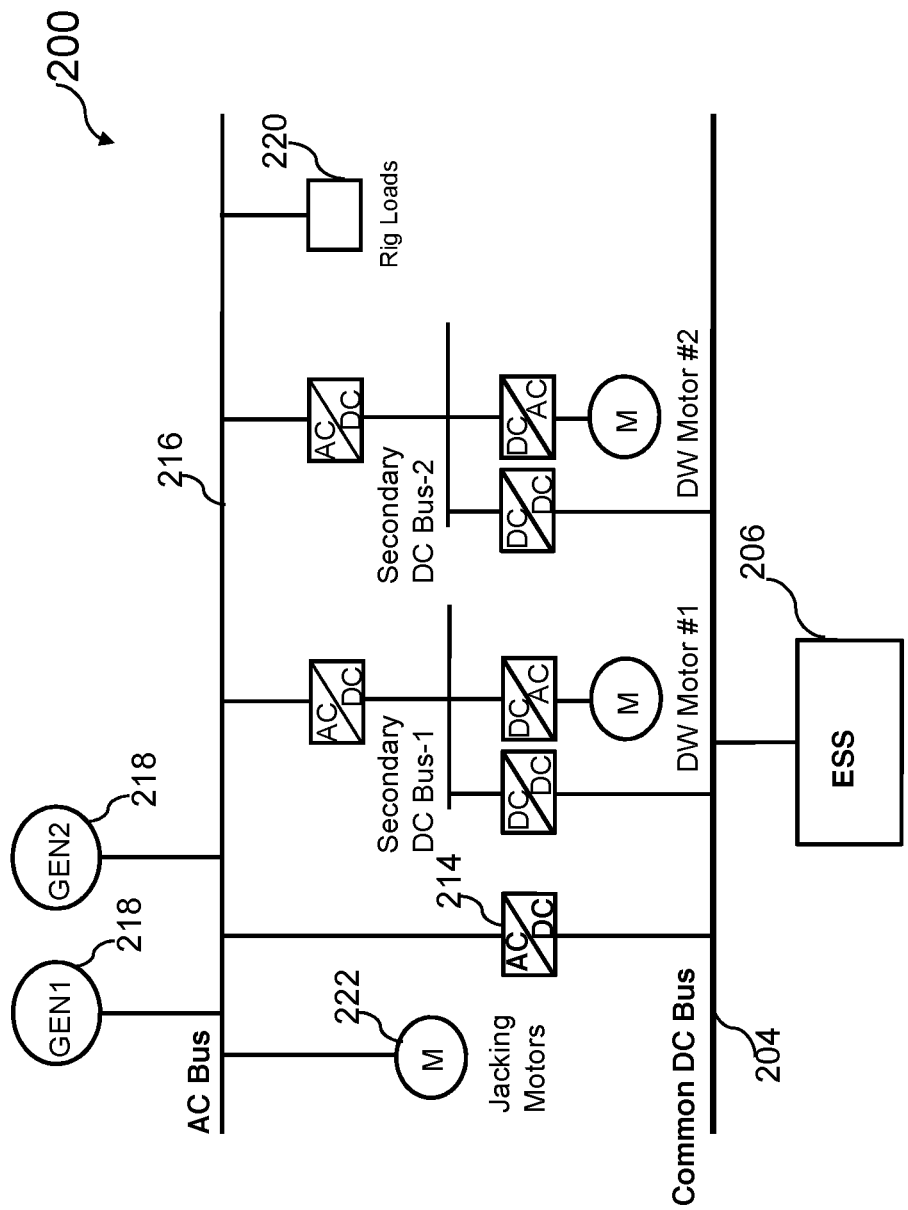
FIG. 2 shows a power storage and supply system for a drilling rig according to a second embodiment of the invention.

FIG. 2 shows a power storage and supply system 200 for a drilling rig according to a second embodiment of the invention. Compared with the power storage and supply system 100 shown in FIG. 1, in this embodiment, the power storage and supply system 200 is further provided with a bi-directional AC-to-DC converter 214 connected between a AC bus 216 and the common DC bus 204.

With the bi-directional AC-to-DC converter 214, the ESS 206 is further configured to be charged during leg(s) and/or hull lowering operations of a jacking system of the drilling rig, and/or charged by a main generator 218 connected to the AC bus 216, and discharge power to the AC bus 216 to power a rig load 220 and/or a jacking motor 222 of the drilling rig when required.

Figure 3:
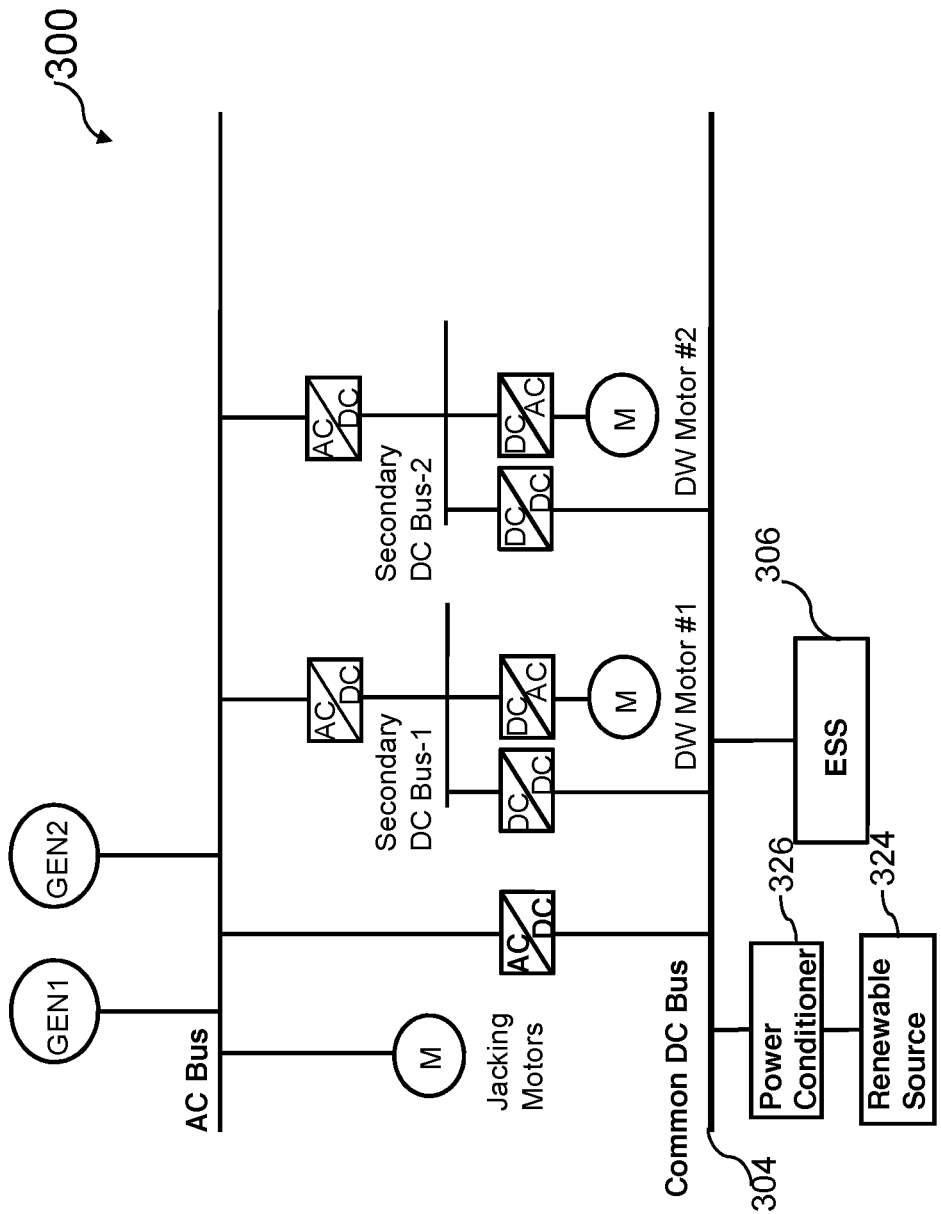
FIG. 3 shows a power storage and supply system for a drilling rig according to a third embodiment of the invention.

FIG. 3 shows a power storage and supply system 300 for a drilling rig according to a third embodiment of the invention. Compared with the power storage and supply system 100 or 200 shown in FIGS. 1 and 2, in this embodiment, the power storage and supply system 300 is further provided with a renewable source input 324, e.g. a solar photovoltaic (PV), connected to the common DC bus 304 and configured to charge the ESS 306 through the common DC bus 304. A power conditioner 326 may be connected between the renewable source input 324 and the common DC bus 304. The power conditioner 326 includes devices which use power electronic technologies to convert electrical power from one form to another, e.g. AC-to-DC or vice versa, and/or convert between various voltage levels e.g. DC-to-DC converter and/or provide specific power qualities required by the systems being integrated.

Figure 4:
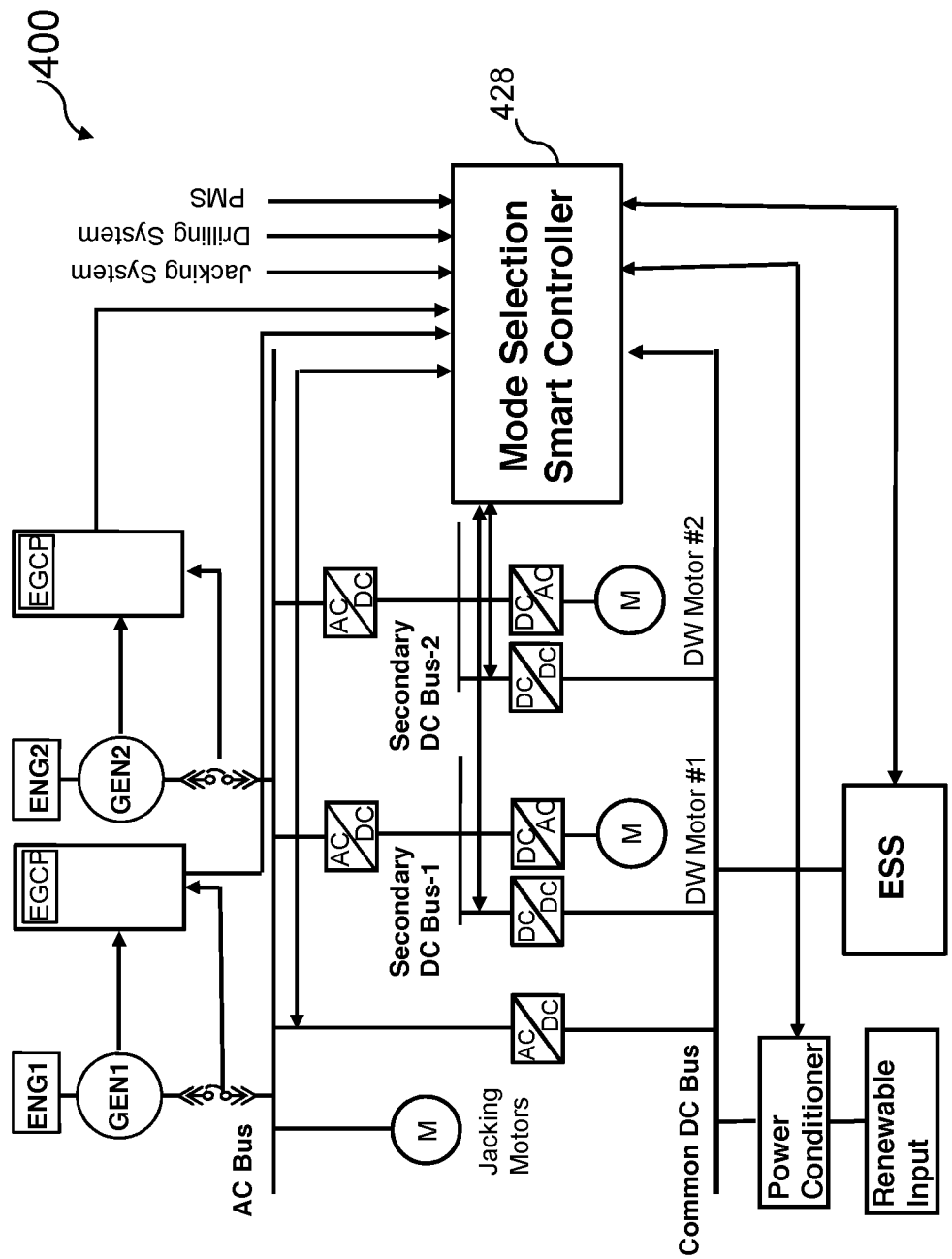
FIG. 4 shows a power storage and supply system for a drilling rig according to a fourth embodiment of the invention.

FIG. 4 shows a power storage and supply system 400 for a drilling rig according to a fourth embodiment of the invention. As shown in FIG. 4, in this embodiment, the power storage and supply system 400 is further provided with a Mode Selection Smart Controller configured to receive at least one input signal/electrical command signal from Engine Control Panel (EGCP), Power Management System (PMS), renewable source, switchboards, the ESS, sensors, the AC bus, the common DC bus, converters in the power supply system, and/or machinery control system in the drilling rig such as a jacking system, a drilling system and other operation control system, and based on the received at least one electrical command signal, monitor and determine a type of operation taking place in the drilling rig, and/or control selection of a mode of charging and discharging of the ESS, and/or control operation of at least one converter, e.g. the at least one bi-directional DC-to-DC converter and the bi-directional AC-to-DC converter, in the power supply system.

In this embodiment, the at least one input signal/electrical command signal includes at least one parameter of voltage (V), current (I), power factor (pf), active power (kW), reactive power (kVAR), frequency (f), and/or on-off, speed, rate, and weight. With the received at least one parameter, the Mode Selection Smart Controller is able to monitor and determine the type of operation taking place in the drilling rig and control operation of at least one converter in the power storage and supply system and hence power flow between the ESS and the AC and DC buses in the power supply system.

As will be appreciated from the above, the power storage and supply system 100-400 disclosed in embodiments above may include at least one of the following features:
Feature 1: Drawworks Regenerative Energy Recovery;
Feature 2: Jacking Regenerative Energy Recovery;
Feature 3: Fuel Efficient Operation Mode;
Feature 4: Jacking Inrush Current Reduction
Feature 5: Reduce Drilling DC Power Variation;
Feature 6: Optimal Discharge Mode;
Feature 7: Renewable Input FIG. 5(a) shows Table 1 indicating charging and discharging status of the ESS for each Feature and FIG. 5(b) shows Table 2 indicating benefits of each Feature. For example, the benefits of Features 1-3 and Feature 7 include regenerative energy recovery, fuel optimization and emission. Emission refers to reduction of harmful gases emission, such as nitrogen oxides (NOx), carbon (CO and/or CO2) and sulphur oxides (SOx), which are produced when generator set consumes fuel material. These gases may cause environmental pollution and must be under IMO (International Maritime Organization) standard regulations. One of main advantage of the embodiment of the invention is that the efficiency of fuel consumption is improved such that the harmful gases emission of the drilling rig is reduced. Feature 3 can further improve availability of the power supply system since the power stored in the ESS during Fuel Efficient Operation Mode can be used as an extra boost for the power system when required. Feature 4 can improve power quality and reliability; Feature 5 and 6 can further improve power quality, reliability and availability of the power supply system.

Figure 6:
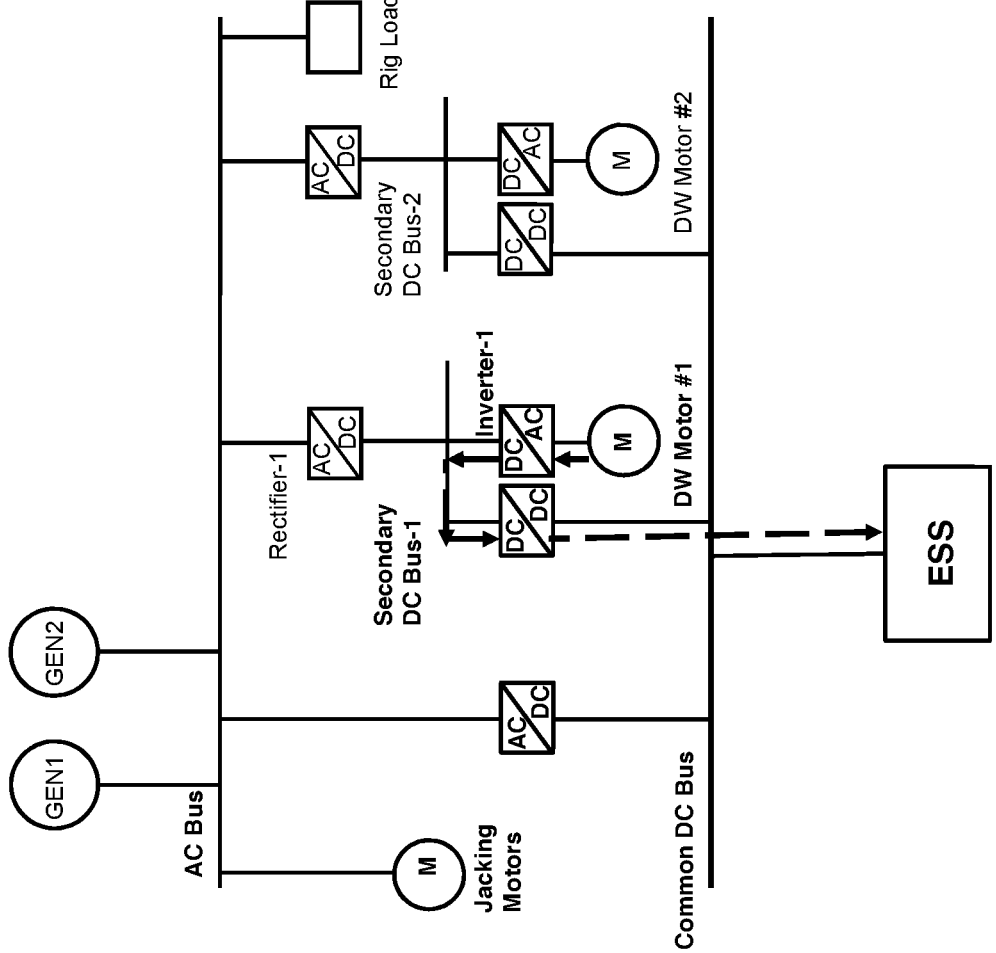
FIG. 6($a$) shows the power flow of Feature 1 according to one embodiment of the invention.

FIG. 6(a) shows the power flow of Feature 1 according to one embodiment of the invention. FIG. 6(b) is a Table indicating status of each component in the power storage and supply system for Feature 1. As shown in FIG. 6(a), the dashed lines with arrows show power flow during a process of charging the ESS by regenerative energy generated by operations of drawworks in the drilling rig. It should be noted that although in this embodiment, only one power flow through the bi-directional DC-to-DC converter is indicated to show the charging process of the ESS, in other embodiments, more than one bi-directional DC-to-DC converter may be used to charge the ESS simultaneously.

If a Mode Selection Smart Controller is provided in the system as shown in FIG. 4, with lowering of a travelling block or drill-string attached for tripping-in operation of the drilling system by the drawworks in the drilling rig, the Mode Selection Smart Controller will receive at least one input signal (i.e. the first electrical command signal) from the drilling system to indicate that the travelling block or drill-string is being lowered. Based on the received input signal which may include at least one parameter selected from the group consisting of weight and length of the drill string, depth of drilling and rate of the lowering, the Mode Selection Smart Controller determines the amount of energy recoverable and controls selection of the charging mode of the ESS to store the regenerative energy generated during operation of the drilling system in the drilling rig.

Figure 7:
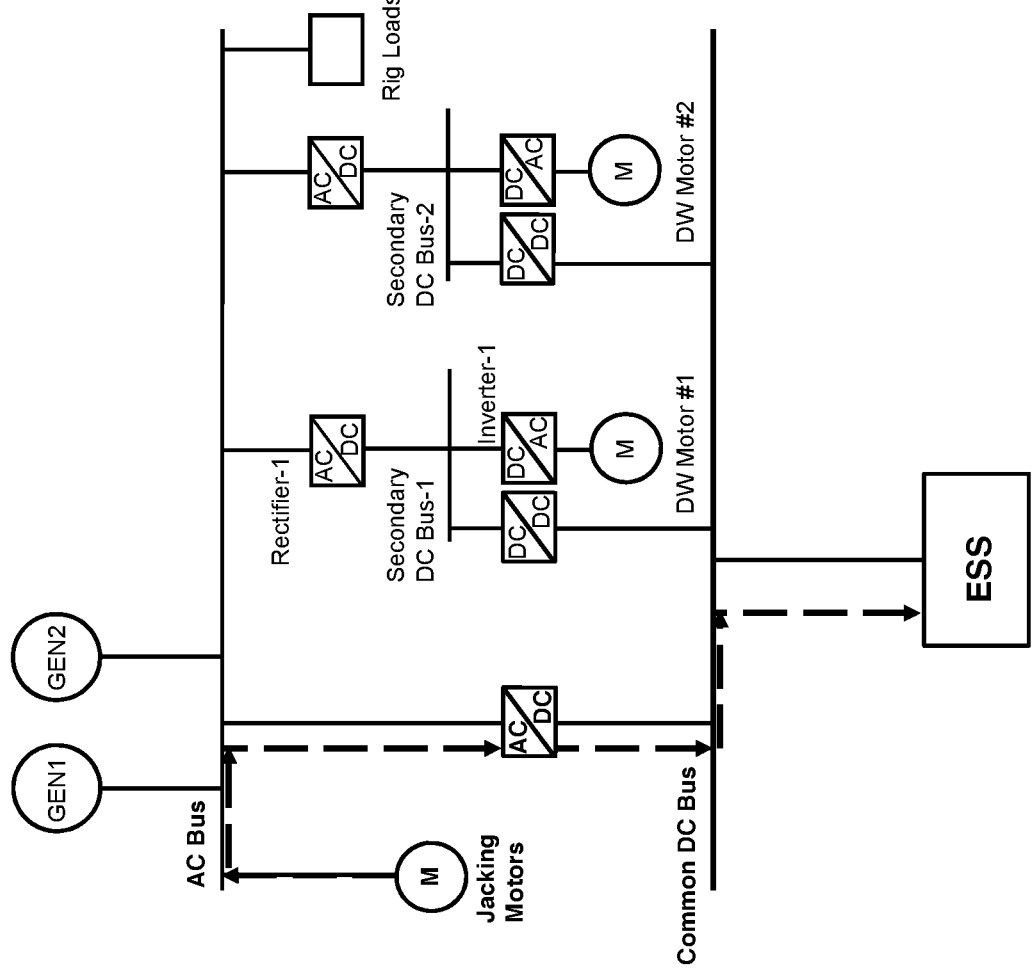
FIG. 7($a$) shows the power flow of Feature 2 according to one embodiment of the invention.

FIG. 7(a) shows the power flow of Feature 2 according to one embodiment of the invention. FIG. 7(b) is a Table indicating status of each component in the power storage and supply system for Feature 2. As shown in FIG. 7(a), the dashed lines with arrows show power flow during a process of charging the ESS by regenerative energy generated by operations of jacking system of the drilling rig.

If a Mode Selection Smart Controller is provided in the system as shown in FIG. 4, when the hull or leg(s) of the jacking system of the drilling rig is being lowered, the Mode Selection Smart Controller will receive at least one input signal (i.e. the third electrical command signal) from the jacking system to indicate that the leg(s) or hull of the jacking system is being lowered. Based on the received input signal which may include at least one parameter selected from the group consisting of jacking start stop, water depth, jacking speed and air gap parameters from the jacking system, the Mode Selection Smart Controller determines the amount of energy recoverable and controls selection of the charging mode of the ESS to store regenerative energy generated during operation of the jacking system in the drilling rig.

Figure 8:
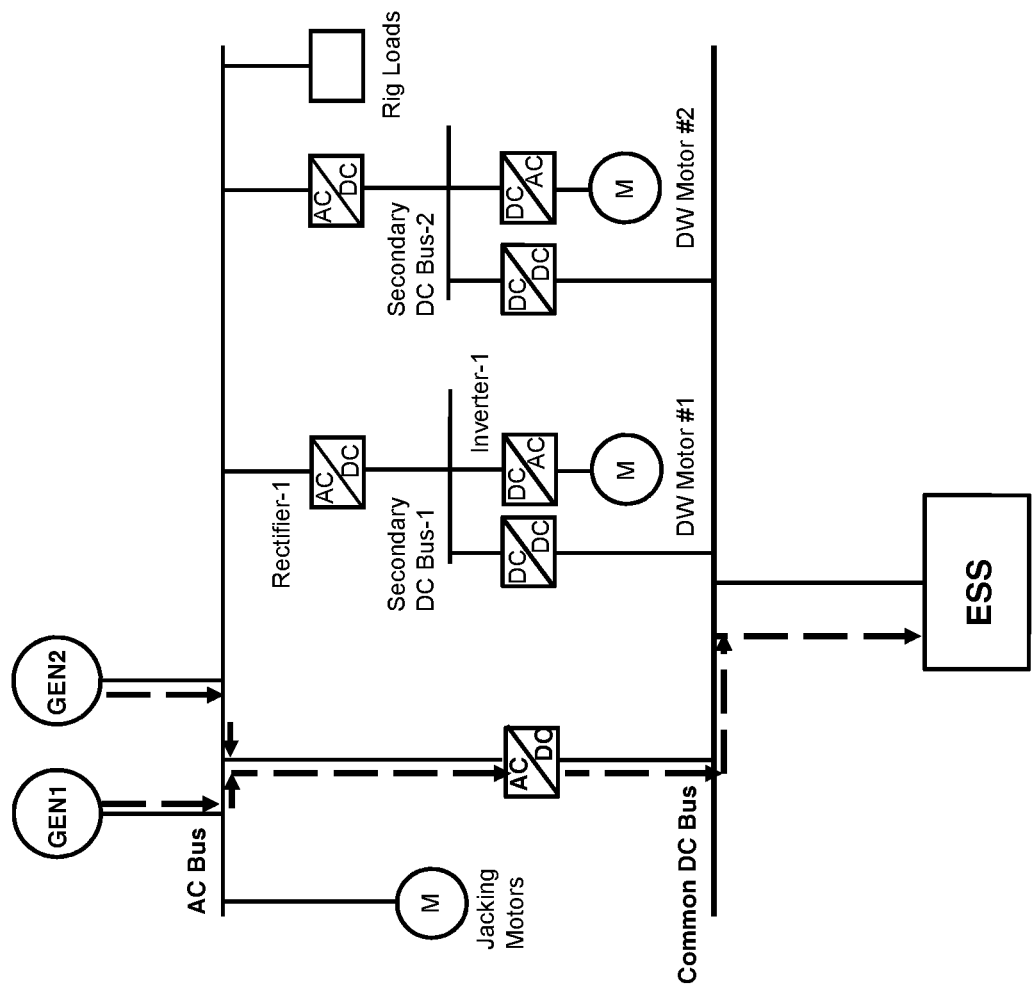
FIG. 8($a$) shows the power flow of Feature 3 according to one embodiment of the invention.

FIG. 8(a) shows the power flow of Feature 3 according to one embodiment of the invention. FIG. 8(b) is a Table indicating status of each component in the power storage and supply system for Feature 3. As shown in FIG. 8(a), the dashed lines with arrows show the power flow during a process of charging the ESS by a generator set (e.g. GEN1, GEN2) of the drilling rig.

The Fuel Efficient Operation Mode, i.e. the Feature 3, is a feature of ESS which means ESS is configured to be charged by the generator sets (GEN 1 and/or GEN 2 in the FIG. 8(a)) through the bi-directional AC-to-DC converter during a low load condition and discharged power to the rig loads or jacking motors connected to the AC bus when required. A low load condition may refer to a load condition where the load of the power storage and supply system is below a predetermined fuel efficiency value. The bi-directional AC-to-DC converter enables the power to flow to and from the specified equipment. If a Mode Selection Smart Controller is provided in the system as shown in FIG. 4, the Mode Selection Smart Controller will receive at least one input signal (i.e. the fifth electrical command signal) from the Power Management System (PMS) which may include at least one parameter selected from a group consisting of percent loading, number of generator sets in operation, frequency of the generator set(s) and/or switchboard, voltage of the generator set(s) and/or switchboard and current of the generator set(s) and/or switchboard. Based on the received input signal, the Mode Selection Smart Controller will control selection of the charging mode of the ESS to charge the ESS by at least one generator set to achieve the Fuel Efficiency Operation Mode.

For generator sets on the drilling rig, the fuel consumed per kilo-watt hour is reduced at higher generator set loading percentage. In other words, the generator set is more efficient at higher loading condition. The ESS allows operation in a Fuel Efficient Operation Mode. This means that the ESS can be charged during low load conditions to bring the generator sets to the next fuel efficient level. In some cases, the ESS can supply power to the loads without having to switch on an additional generator set. This can result in fuel savings and more efficient running of the generator set, thus reducing fuel and maintenance costs for the rig operators.

Figure 9:
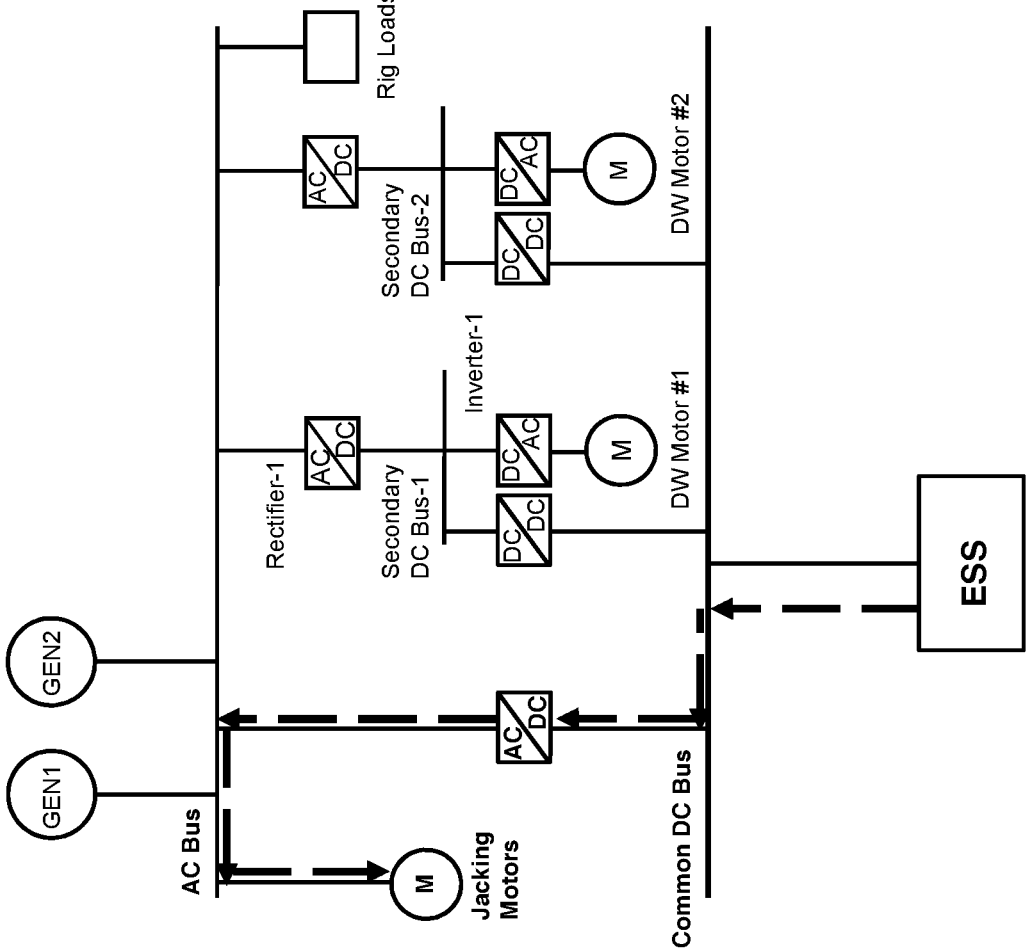
FIG. 9(a) shows the power flow of Feature 4 according to one embodiment of the invention.
FIG. 9(b) is a Table indicating status of each component in the power storage and supply system for Feature 4.

Due to the very fast response time, the ESS can also offer features such as Jacking Inrush Current Reduction and power fluctuation smoothing during drilling operations. FIG. 9(*a*) shows the power flow of Feature 4, i.e. Jacking Motor Starting Inrush Current Reduction, according to one embodiment of the invention. FIG. 9(*b*) is a Table indicating status of each component in the power storage and supply system for Feature 4. As shown in FIG. 9(*a*), the dashed lines with arrows show the power flow during the process of discharging the ESS to power the Jacking Motors of the drilling rig.

If a Mode Selection Smart Controller is provided in the system as shown in FIG. 4, during jacking operation, when jacking motors start drawing inrush current e.g. six times of motor rated current, the Mode Selection Smart Controller will receive at least one input signal (i.e. the fourth electrical command signal) from the jacking system and/or AC bus to indicate that jacking system is being operated. Based on the received input signal which may include at least one parameter selected from the group consisting of voltage, current, power factor and frequency parameters, the Mode Selection Smart Controller determines the amount of energy required and controls selection of discharging mode of the ESS to reduce the jacking inrush current detected at the AC bus.

Figure 10:
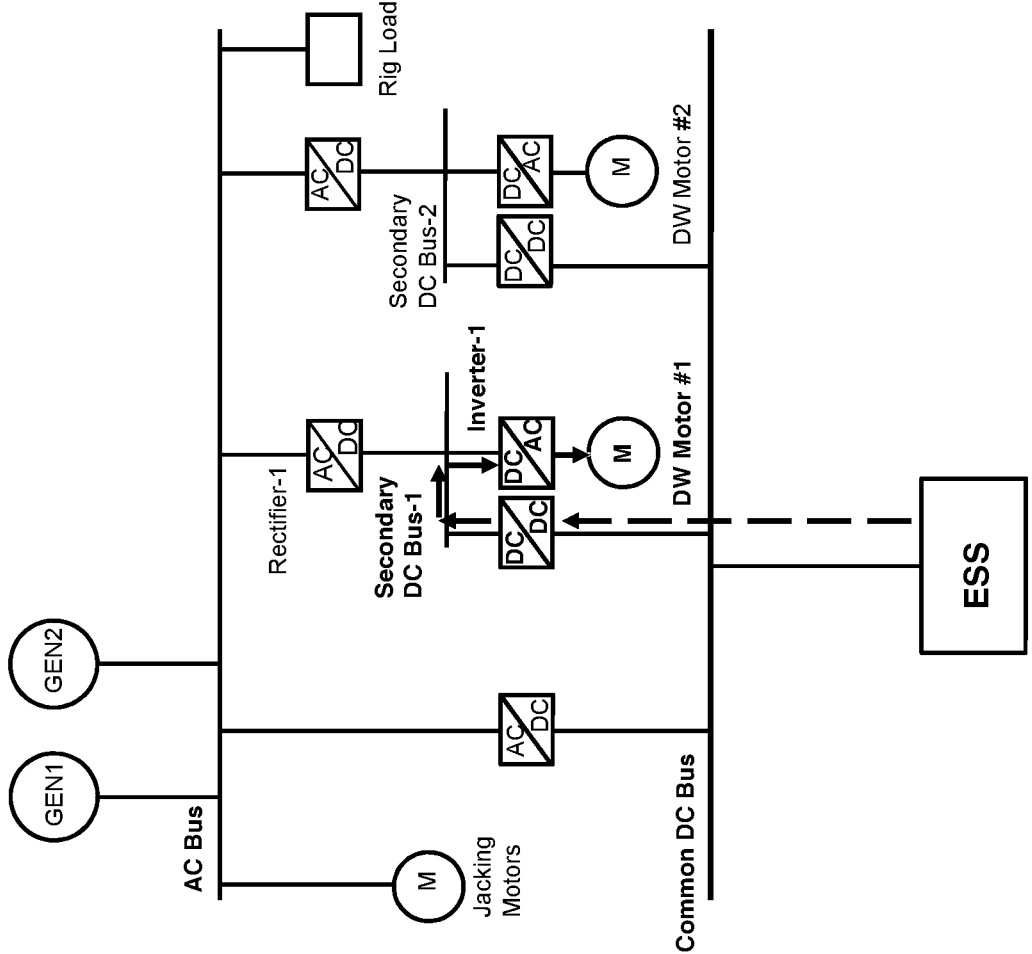
FIG. 10(a) shows the power flow of Feature 5 according to one embodiment of the invention.
FIG. 10(b) is a Table indicating status of each component in the power storage and supply system for Feature 5.

FIG. 10(*a*) shows the power flow of Feature 5, i.e. Reduce Drilling DC Power Variation, according to one embodiment of the invention. FIG. 10(*b*) is a Table indicating status of each component in the power storage and supply system for Feature 5. As shown in FIG. 10(*a*), the bi-directional DC-to-DC converter enables power flow from the ESS to drawworks motors through the common DC bus, the bi-directional DC-to-DC converter, the secondary DC bus and the DC-to-AC inverter. The Mode Selection Smart Controller controls the power flow to reduce drilling DC power variation by discharging energy from the ESS to the common DC bus.

During drilling operation, activities require considerable amount of DC power. The electrical load on secondary DC bus such as drawworks is inconsistent since the weight of the drill string changes as sections are added and/or removed. If a Mode Selection Smart Controller is provided in the system as shown in FIG. 4, the Mode Selection Smart Controller will receive at least one input signal (i.e. the second electrical command signal) from the drilling system to indicate a load variation and operation is being performed e.g. hoisting, casing etc. Based on the received input signal which may include at least one parameter selected from the group consisting of voltage, current, power factor, and frequency parameters from the drilling system, the Mode Selection Smart Controller determines the amount of energy required and controls selection of discharging mode of the ESS to reduce the power variation and improve the power quality in the secondary DC bus. For example, the Mode Selection Smart Controller may control the ESS power to be discharged to one or more inverters which could be powering motors for different uses to reduce drilling DC power variation.

It should be noted that although in this embodiment, only one power flow through the bi-directional DC-to-DC converter is indicated to show the discharging process of the ESS, in other embodiments, more than one bi-directional DC-to-DC converters may be used to discharge power to motors for different uses simultaneously.

Figure 11:
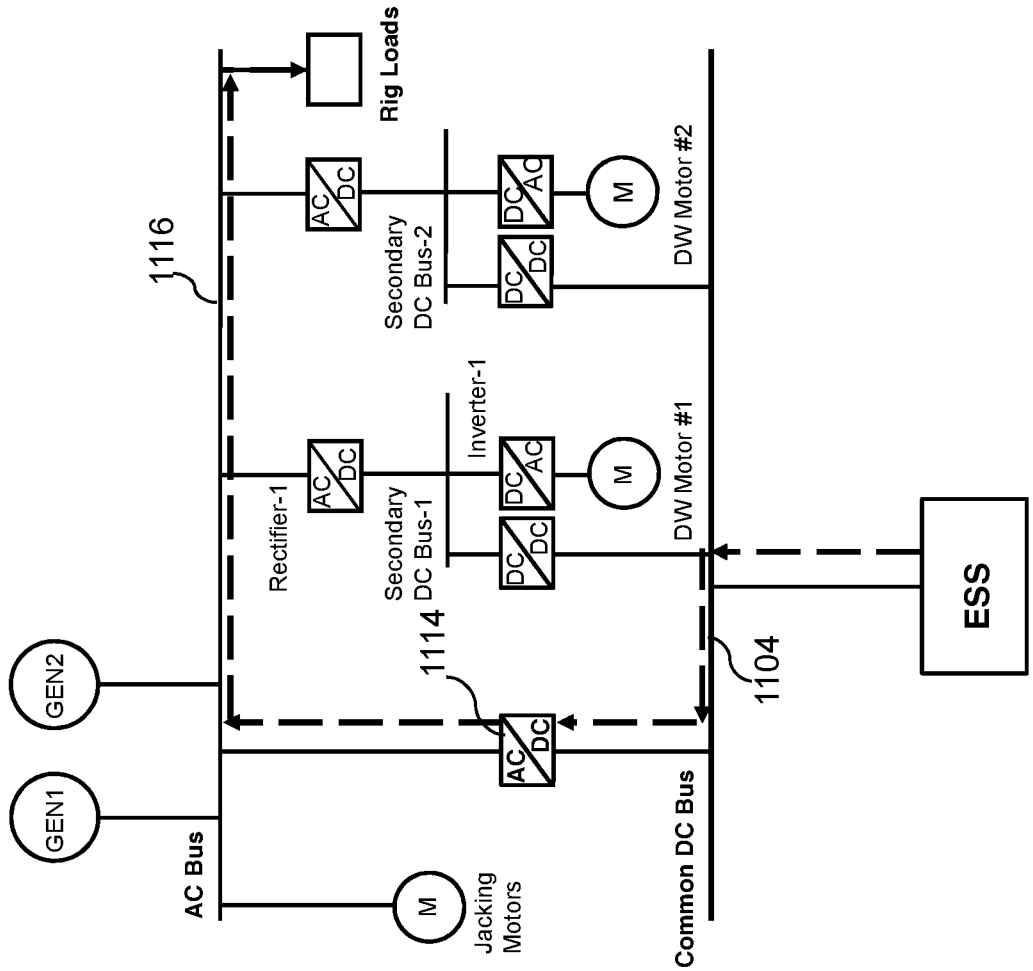
FIG. 11(a) shows the power flow of Feature 6 according to one embodiment of the invention.
FIG. 11(b) is a Table indicating status of each component in the power storage and supply system for Feature 6.

FIG. 11(*a*) shows the power flow of Feature 6, i.e. Optimal Discharge Mode, according to one embodiment of the invention. FIG. 11(*b*) is a Table indicating status of each component in the power storage and supply system for Feature 6. The bi-directional AC-to-DC converter enables the power flow from the ESS to rig loads connected to the AC bus. Load variations on AC bus may be managed through outputs of generator sets and/or ESS. As shown in FIG. 11(*a*), the ESS can be configured to discharge power to the rig loads connected to the AC bus through the bi-directional AC-to-DC converter 1114 between the AC bus 1116 and the common DC bus 1104.

The rig loads connected to the AC bus may include electrical base load such as marine, lighting, hotel etc., and other loads such as chillers, sea water cooling pumps, and air compressors. If a Mode Selection Smart Controller is provided in the system as shown in FIG. 4, the Mode Selection Smart Controller will receive at least one input signal (i.e. the sixth electrical command signal) from the AC bus to indicate power demand for the rig loads connected to the AC bus. Based on the received input signal which may include at least one parameter selected from the group consisting of: power parameters such as voltage, current, power factor, and frequency, the Mode Selection Smart Controller determines the amount of energy required and controls selection of discharging mode of the ESS to discharge power to the rig loads.

Figure 12:
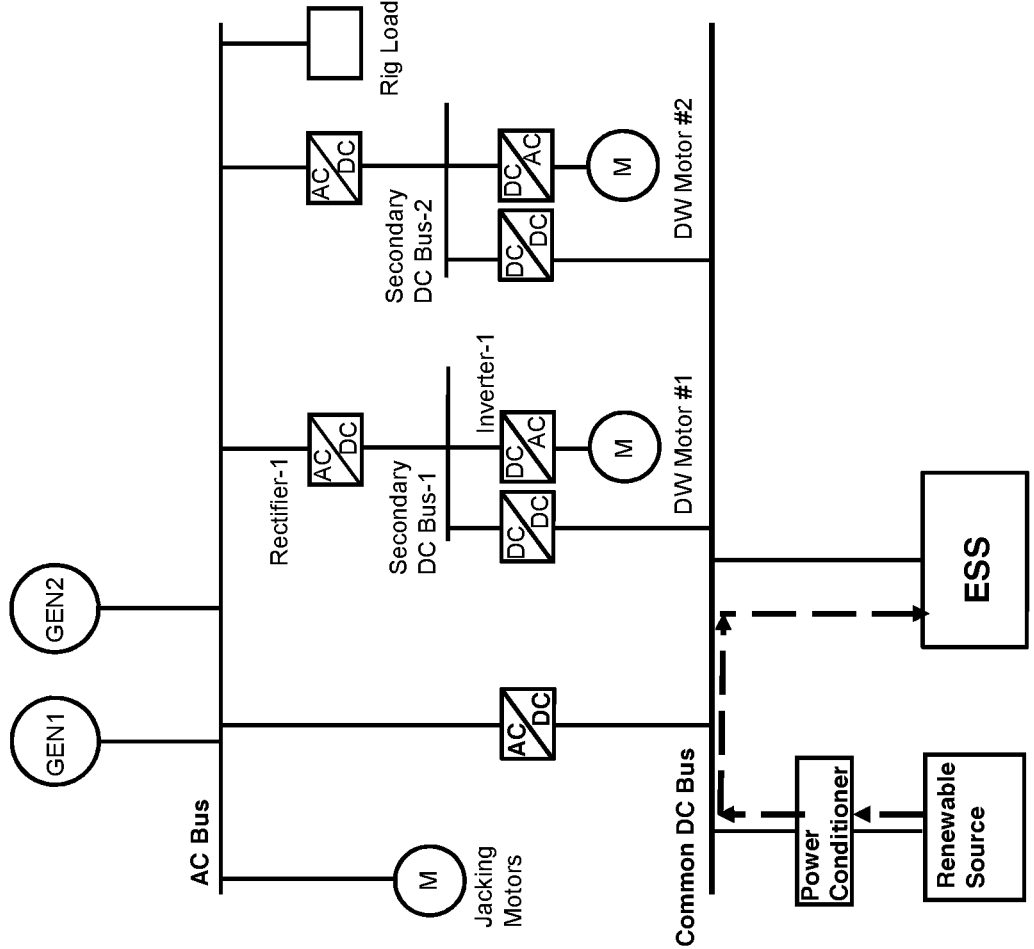
FIG. 12(a) shows the power flow of Feature 7 according to one embodiment of the invention.
FIG. 12(b) is a Table indicating status of each component in the power storage and supply system for Feature 7.

FIG. 12(*a*) shows the power flow of Feature 7, i.e. renewable input, according to one embodiment of the invention. FIG. 12(*b*) is a Table indicating status of each component in the power storage and supply system for Feature 7. As shown in FIG. 12(*a*), the dashed lines with arrows show power flow during a process of charging the ESS by a renewable source input.

If a Mode Selection Smart Controller is provided in the system as shown in FIG. 4, when the renewable energy source is available, the Mode Selection Smart Controller will receive at least one input signal (i.e. the seventh electrical command signal) from the power conditioner to indicate an amount of energy available. Based on the received input signal which may include at least one parameter selected from a group consisting of the voltage and current parameters of the power conditioner, the Mode Selection Smart Controller determines the amount of energy recoverable and controls selection of the charging mode of the ESS. For example for Solar PV, the amount of sunlight can be used as an input signal for the system.

As will be appreciated from the above, embodiments of the invention provide an effective system and method for absorbing and storing regenerative energy generated during operations of a drilling system in the drilling rig, and for discharging the stored energy or power to operate motors and/or other loads when required. In conclusion, the method and system disclosed in embodiments of this invention has the following technology benefits:
1. Increase Spinning Reserve
2. Absorb Jacking Inrush Current
3. Increase Equipment's Life
4. Reduces Fuel Consumption
5. Reduces Engine Start/Stop Operations
6. Back-up Power Option
7. Reduces Emissions
8. Reduces Maintenance Cost Additionally, the foregoing description is described with reference to the drawworks and jacking system in a drilling rig which can produce regenerative energy during operations. However, the system and method disclosed in embodiments of the invention can also be applied to other systems which can produce regenerative energy during its operations, e.g. a crane and conveyer belt system and a system including a plurality of standalone Variable Frequency Drives (VFDs) and rectifiers but without bi-directional AC-to-DC converters. In these systems, a common DC bus can also be provided to link up for ESS applications.

It is to be understood that the embodiments and features described above should be considered exemplary and not restrictive. For example, the above-described embodiments may be used in combination with each other. Many other embodiments will be apparent to those skilled in the art from consideration of the specification and practice of the invention. The scope of the invention should, therefore, be determined with reference to the appended claims, along with the full scope of equivalents to which such claims are entitled. Furthermore, certain terminology has been used for the purposes of descriptive clarity, and not to limit the disclosed embodiments of the invention.

The invention claimed is:

1. A power storage and supply method for a drilling rig, the method comprising:
   controlling, by a Mode Selection Smart Controller in a power storage and supply system, selection of a charging mode of an Energy Storage System (ES S) in the power storage and supply system to store regenerative energy generated during an operation of the drilling system in the drilling rig, wherein the power storage and supply system comprises:
   a primary common DC bus;
   the Energy Storage System (ES S) connected to the primary common DC bus;
   at least one secondary DC bus;
   at least one bi-directional DC-to-DC converter connected between the primary common DC bus and the at least one secondary DC bus;
   at least one DC-to-AC inverter connected between the at least one secondary DC bus and at least one motor group; and
   the Mode Selection Smart Controller,
   wherein the primary common DC bus is provided to enable connection between the Energy Storage System (ESS) and all of the at least one bi-directional converter in the power storage and supply system; and
   charging the ESS by the regenerative energy generated during the operation of the drilling system from one or more than one of the at least one motor group in the power storage and supply system.

2. The method according to claim 1, wherein the controlling selection of a charging mode of the ESS to store regenerative energy generated during an operation of the drilling system comprises:
   controlling, by the Mode Selection Smart Controller, selection of the charging mode of the ESS to store regenerative energy generated during lowering of a travelling block or drill-string attached for tripping-in operation of the drilling system by a drawworks in the drilling rig;
   wherein the at least one motor group includes a motor for operating the drawworks in the drilling rig.

3. The method according to claim 2, wherein the controlling selection of a charging mode of the ESS to store regenerative energy generated during lowering of a travelling block or drill-string comprises:
   receiving, by the Mode Selection Smart Controller, at least one first electrical command signal from the drilling system to indicate that the travelling block or drill-string attached for tripping-in operation of the drilling system is being lowered, and
   based on the received at least one first electrical command signal, determining, by the Mode Selection Smart Controller, an amount of energy recoverable and controlling selection of a charging mode of the ESS to store the regenerative energy generated during the operation of the drilling system.

4. The method according to claim 1, further comprising:
   controlling, by the Mode Selection Smart Controller, selection of a charging mode of the ESS to store regenerative energy generated during a lowering operation of a leg or hull of a jacking system for the drilling rig, wherein a bi-directional AC-to-DC converter is connected between the primary DC bus and an alternating current (AC) bus, and the jacking system is connected to the AC bus,
   charging the ESS by the regenerative energy generated during the lowering operation of the leg or hull of the jacking system for the drilling rig.

5. The method according to claim 4, wherein the controlling selection of a charging mode of the ESS during a lowering operation of a leg or hull of a jacking system comprises:
   receiving, by the Mode Selection Smart Controller, at least one third electrical command signal from the jacking system to indicate that the leg or hull of the jacking system is being lowered, and
   based on the received at least one third electrical command signal, determining, by the Mode Selection Smart Controller, an amount of energy recoverable and controlling selection of a charging mode of the ESS to store the regenerative energy generated during the operation of the jacking system.

6. The method according to claim 5, further comprising:
   receiving, by the Mode Selection Smart Controller, at least one fourth electrical command signal from the jacking system/the AC bus to indicate that the jacking system is being operated, and based on the received at least one fourth electrical command signal, determining, by the Mode Selection Smart Controller, an amount of energy required and controlling selection of a discharging mode of the ESS to reduce Jacking Motors Starting Inrush Current at the AC bus.

7. The method according to claim 5, further comprising:
receiving, by the Mode Selection Smart Controller, at least one sixth electrical command signal from the AC bus to indicate a power demand for rig loads connected to the AC bus, and
based on the received at least one sixth electrical command signal, determining, by the Mode Selection Smart Controller, an amount of energy required and controlling selection of a discharging mode of the ESS to discharge power to the rig loads connected to the AC bus.

8. The method according to claim 4, further comprising:
controlling, by the Mode Selection Smart Controller, selection of a charging mode of the ESS when a power supply system in the drilling rig is in a predetermined low load condition, and
charging the ESS by a generator set connected to the AC bus.

9. The method according to claim 8, wherein the controlling selection of a charging mode of the ESS when a power supply system in the drilling rig is in a predetermined low load condition further comprises:
receiving, by the Mode Selection Smart Controller, at least one fifth electrical command signal from a Power Management System (PMS), which includes at least one parameter selected from the group consisting of percent loading, number of generator sets in operation, frequency of the generator sets and/or switchboard, voltage of the generator sets and/or switchboard and current of the generator sets and/or switchboard, and
based on the received at least one fifth electrical command signal, controlling, by the Mode Selection Smart Controller, selection of a charging mode of the ESS to achieve a Fuel Efficiency Operation Mode.

10. The method according to claim 1, further comprising:
controlling, by the Mode Selection Smart Controller, selection of a charging mode of the ESS to charge the ESS by a renewable source input through a power conditioner, wherein the power conditioner is connected between the primary common DC bus and the renewable source input.

11. The method according to claim 10, wherein the controlling selection of a charging mode of the ESS to charge the ESS by a renewable source input comprises:
receiving, by the Mode Selection Smart Controller, at least one seventh electrical command signal from the power conditioner to indicate that an amount of energy is available in the renewable source input, and
based on the received at least one seventh electrical command signal, determining, by the Mode Selection Smart Controller, an amount of energy recoverable and controlling selection of a charging mode of the ESS to charge the ESS by the renewable source input.

12. The method according to claim 1, wherein the at least one bi-directional DC-to-DC converter includes a plurality of bi-directional DC-to-DC converters and the at least one secondary DC bus includes a plurality of secondary DC buses wherein at least two of the plurality of secondary DC buses are electrically unconnected or connected.

13. The method according to claim 12, wherein the step of charging the ESS further comprises: charging the ESS by at least two of the plurality of bi-directional DC-to-DC converters simultaneously.

14. The method according to claim 1, further comprising:
controlling, by the Mode Selection Smart Controller, selection of a discharging mode of the ESS when a load variation and operation is being performed by the drilling system to reduce drilling DC power variation, and
discharging power from the ESS to any motor group connected to one or more of the at least one DC-to-AC inverter.

15. The method according to claim 14, wherein the controlling selection of a discharging mode of the ESS when a load variation and operation is being performed by the drilling system comprises:
receiving, by the Mode Selection Smart Controller, at least one second electrical command signal from the drilling system to indicate that a load variation and operation is being performed, and
based on the received at least one second electrical command signal, determining, by the Mode Selection Smart Controller, an amount of energy required and controlling selection of a discharging mode of the ESS to reduce drilling DC power variation.

16. A power storage and supply system for a drilling rig, the system comprising:
a primary common direct current (DC) bus;
an Energy Storage System (ES S) connected to the primary common DC bus;
at least one secondary DC bus;
at least one bi-directional DC-to-DC converter connected between the primary common DC bus and the at least one secondary DC bus;
at least one DC-to-AC inverter connected between the at least one secondary DC bus and at least one motor group; and
a Mode Selection Smart Controller,
wherein the primary common DC bus is provided to enable connection between the Energy Storage System (ESS) and all of the at least one bi-directional converter in the power storage and supply system;
wherein the Mode Selection Smart Controller is configured to control selection of a charging mode of the ESS to store regenerative energy generated during an operation of the drilling system in the drilling rig;
wherein the ESS is connected to the primary common DC bus and configured to be charged by the regenerative energy generated during the operation of the drilling system from one or more than one of the at least one motor group.

17. The system according to claim 16, wherein the at least one motor group includes a motor for operating a drawworks in the drilling rig, wherein the motor for operating the drawworks is connected to a DC-to-AC inverter,
wherein the Mode Selection Smart Controller is further configured to control selection of the charging mode of the ESS to store regenerative energy generated during lowering of a travelling block or drill-string attached for tripping-in operation of the drilling system by the drawworks in the drilling rig.

18. The system according to claim 17, wherein:
the Mode Selection Smart Controller is further configured to receive at least one first electrical command signal from the drilling system to indicate that a travelling block or drill-string attached for tripping-in operation of the drilling system is being lowered, and based on the received at least one first electrical command signal, determine an amount of energy recoverable and control selection of the charging mode of the ESS to store the regenerative energy generated during the operation of the drilling system.

19. The system according to claim 16, further comprising:
a bi-directional AC-to-DC converter connected between an alternating current (AC) bus and the primary common DC bus;
wherein the Mode Selection Smart Controller is further configured to control selection of a charging mode of the ESS to store regenerative energy generated during a lowering operation of a leg or hull of a jacking system for the drilling rig, wherein the jacking system is connected to the AC bus;
wherein the ESS is further configured to be charged by the regenerative energy generated during the lowering operation of the leg or hull of the jacking system.

20. The system according to claim 19, wherein:
the Mode Selection Smart Controller is further configured to receive at least one third electrical command signal from the jacking system to indicate that the leg or hull of the jacking system is being lowered, and
based on the received at least one third electrical command signal, determine an amount of energy recoverable and control selection of a charging mode of the ESS to store the regenerative energy generated during the operation of the jacking system.

21. The system according to claim 20, wherein:
the Mode Selection Smart Controller is further configured to receive at least one fourth electrical command signal from the jacking system/the AC bus to indicate that jacking system is being operated, and
based on the received at least one fourth electrical command signal, determine an amount of energy required and control selection of a discharging mode of the ESS to reduce Jacking Motors Starting Inrush Current detected at the AC bus.

22. The system according to claim 20, wherein:
the Mode Selection Smart Controller is further configured to receive at least one sixth electrical command signal from the AC bus to indicate a power demand for rig loads connected to the AC bus, and
based on the received at least one sixth electrical command signal, determine an amount of energy required and control selection of a discharging mode of the ESS to discharge power to the rig loads.

23. The system according to claim 19, wherein the Mode Selection Smart Controller is further configured to control selection of a charging mode of the ESS when a power supply system in the drilling rig is in a predetermined low load condition to charge the ESS by a generator set connected to the AC bus.

24. The system according to claim 23, wherein:
the Mode Selection Smart Controller is further configured to receive at least one fifth electrical command signal from a Power Management System (PMS), which includes at least one parameter selected from a group consisting of percent loading, number of generator sets in operation, frequency of the generator sets and/or switchboard, voltage of the generator sets and/or switchboard and current of the generator sets and/or switchboard, and
based on the received at least one fifth electrical command signal, control selection of a charging mode of the ESS to achieve a Fuel Efficiency Operation Mode.

25. The system according to claim 16, further comprising:
a renewable source input;
a power conditioner connected between the primary common DC bus and the renewable source input;
wherein the Mode Selection Smart Controller is further configured to control selection of a charging mode of the ESS to charge the ESS by the renewable source input through the power conditioner and the primary common DC bus.

26. The system according to claim 25, wherein:
the Mode Selection Smart Controller is further configured to receive at least one seventh electrical command signal from the power conditioner to indicate that an amount of energy is available, and
based on the received at least one seventh electrical command signal, determine an amount of energy recoverable and control selection of a charging mode of the ESS to charge the ESS by the renewable source input.

27. The system according to claim 16, wherein the at least one bi-directional DC-to-DC converter includes a plurality of bi-directional DC-to-DC converters and the at least one secondary DC bus includes a plurality of secondary DC buses wherein at least two of the plurality of secondary DC buses are electrically unconnected or connected.

28. The system according to claim 27, wherein the ESS is configured to be simultaneously charged by at least two of the plurality of bi-directional DC-to-DC converters.

29. The system according to claim 16, wherein the Mode Selection Smart Controller is further configured to control selection of a discharging mode of the ESS when a load variation and operation is being performed by the drilling system to reduce drilling DC power variation, and
the ESS is further configured to discharge power to any motor group connected to one or more of the at least one DC-to-AC inverter.

30. The system according to claim 29, wherein:
the Mode Selection Smart Controller is further configured to receive at least one second electrical command signal from the drilling system to indicate that a load variation and operation is being performed, and
based on the received at least one second electrical command signal, determine an amount of energy required and control selection of a discharging mode of the ESS to reduce drilling DC power variation.

* * * * *